US012542583B2

United States Patent
Sohrabi et al.

(10) Patent No.: US 12,542,583 B2
(45) Date of Patent: Feb. 3, 2026

(54) ENERGY-EFFICIENT PRECODING WITH CONTROLLABLE POWER DISTRIBUTION

(71) Applicant: Nokia Solutions and Networks Oy, Espoo (FI)

(72) Inventors: Foad Sohrabi, Murray Hill, NJ (US); Jinfeng Du, Murray Hill, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 18/745,536

(22) Filed: Jun. 17, 2024

(65) Prior Publication Data

US 2025/0007575 A1  Jan. 2, 2025

(30) Foreign Application Priority Data

Jun. 30, 2023  (EP) .................................... 23182677

(51) Int. Cl.
*H04B 7/0456*  (2017.01)

(52) U.S. Cl.
CPC .................................. *H04B 7/0456* (2013.01)

(58) Field of Classification Search
CPC ... H04B 7/02; H04B 7/04; H04B 7/06; H04B 7/0426; H04B 7/0456; H04L 5/00; H04L 27/00; H04W 52/24; H04W 52/34; H04W 52/36; H04W 52/42; H04W 72/04
USPC ......... 370/329; 375/219, 260, 267, 295, 316
See application file for complete search history.

(56) References Cited

U.S. PATENT DOCUMENTS

| | | | |
|---|---|---|---|
| 8,442,142 B2 | 5/2013 | Ojard et al. | |
| 9,143,211 B2 | 9/2015 | Pi et al. | |
| 11,963,111 B2 | 4/2024 | Yang et al. | |
| 2013/0051486 A1* | 2/2013 | Pi | H04B 7/0465 375/267 |
| 2015/0063254 A1* | 3/2015 | Yue | H04B 7/0465 375/267 |
| 2016/0241316 A1 | 8/2016 | Fattouche et al. | |

FOREIGN PATENT DOCUMENTS

CN   111314932 A   6/2020

OTHER PUBLICATIONS

Boccardi et al. "Zero-Forcing Precoding for the MIMO Broadcast Channel under Per-Antenna Power Constraints", IEEE, Jul. 2006 (Year: 2006).*

(Continued)

*Primary Examiner* — Shawkat M Ali
(74) *Attorney, Agent, or Firm* — Nokia Technologies Oy

(57) ABSTRACT

Systems, methods, apparatuses, and computer program products for energy-efficient precoding with controllable power distribution. A method may include generating a digital precoder with controllable flatness based on at least one of a plurality of control parameters. The method may also include controlling flatness of a power distribution across a set of antennas, panels, or access points. The method may further include balancing, based on the control of the flatness of the power distribution, spectral efficiency and energy efficiency according to respective predefined values of spectral efficiency and energy efficiency. The balancing may include adjusting the at least one of the plurality of control parameters.

16 Claims, 5 Drawing Sheets

(56) References Cited

OTHER PUBLICATIONS

Wiesel et al., "Zero-Forcing Precoding and Generalized Inverses", IEEE Transactions on Signal Processing, vol. 56, No. 09, Sep. 2008, pp. 4409-4418.

Zhang, "Cooperative Multi-Cell Block Diagonalization with Per-Base-Station Power Constraints", IEEE Journal on Selected Areas in Communications, vol. 28, No. 09, Dec. 2010, pp. 1435-1445.

Pham et al., "Efficient Zero-Forcing Precoder Design for Weighted Sum-Rate Maximization with Per-Antenna Power Constraint", IEEE Transactions on Vehicular Technology, vol. 67, No. 04, Apr. 2018, pp. 3640-3645.

Shi et al., "An Iteratively Weighted MMSE Approach to Distributed Sum-Utility Maximization for a MIMO Interfering Broadcast Channel", IEEE Transactions on Signal Processing, vol. 59 No. 09, Sep. 2011, pp. 4331-4340.

Zhao et al., "Rethinking WMMSE: Can its complexity scale linearly with the No. of BS antennas?", IEEE Transactions on Signal Processing, vol. 71, Feb. 27, 2023, pp. 433-446.

Shi et al., "Secure Beamforming for MIMO Broadcasting With Wireless Information and Power Transfer", IEEE Transactions on Wireless Communications, vol. 14, No. 05, May 2015, pp. 2841-2853.

Pham et al., "On the MIMO Capacity With Joint Sum and Per-Antenna Power Constraints: A New Efficient Numerical Method", IEEE Transactions on Vehicular Technology, vol. 71, No. 09, Sep. 2022, pp. 10179-10184.

Huang et al., "Energy and Spectral Efficient Tradeoff for Massive MIMO Enabled Heterogenous Networks with Wireless Backhaul", IEEE 18th International Conference on Communication Technology (ICCT), Oct. 8-11, 2018, pp. 832-837.

Zhang et al., "Massive MIMO with Per-Antenna Power Constraint", IEEE Global Conference on Signal and Information Processing (GlobalSIP), Dec. 3-5, 2014, pp. 642-646.

Pham, "On the MIMO Capacity with Multiple Power Constraints", Doctoral Dissertation, Sep. 2019, 131 pages.

Extended European Search Report received for corresponding European Patent Application No. 23182677.7, dated Jan. 3, 2024, 9 pages.

Bobrov et al., "Power Allocation Algorithms for Massive MIMO Systems with Multi-Antenna Users", arXiv, Jun. 8, 2023, pp. 1-32.

Rodriguez-Fernandez et al., "Hybrid Precoding and Combining for Frequency-Selective mmWave MIMO Systems with Per-antenna Power Constraints", arXiv, Feb. 1, 2019, pp. 1-32.

Zhang et al., "Energy-Efficient Massive MIMO With Decentralized Precoder Design", IEEE Transactions on Vehicular Technology, vol. 69, No. 12, Dec. 2020, pp. 15370-15384.

\* cited by examiner

Algorithm 1 Flat-WMMSE Precoding

Input: System dimensions including $N, K, M_k$, and $L_k$ respectively denoting the number of BS's antennas, the number of users, the number of antennas at user $k$, and the number of layers intended to user $k$; channel matrix $\mathbf{H} = [\mathbf{H}_1^T, \ldots, \mathbf{H}_K^T]^T$; users' priority weights $\{\alpha_k\}_{\forall k}$; noise variance $\sigma^2$; power constraints $P_{TX}$, $P_{PAPC}^{ub}$ and $P_{PAPC}^{lb}$; rate convergence threshold $\epsilon$; maximum number of iterations $i_{max}$.

1: Initialize (feasible) digital precoder $\mathbf{D} = [\mathbf{D}_1, \ldots, \mathbf{D}_K]$, $\mathbf{W}_k = \mathbf{I}, \forall k$, and $i = 1$.
2: repeat
3:   $\tilde{\mathbf{D}} = \mathbf{D}$;
4:   $\mathbf{U}_k = \left(\sum_{j=1}^K \mathbf{H}_k \mathbf{D}_j \mathbf{D}_j^H \mathbf{H}_k^H + \sigma^2 \mathbf{I}\right)^{-1} \mathbf{H}_k \mathbf{D}_k, \forall k$;
5:   $\mathbf{W}_k = (\mathbf{I} - \mathbf{U}_k^H \mathbf{H}_k \mathbf{D}_k)^{-1}, \forall k$;
6:   $\mathbf{A} = \text{blkdiag}(\alpha_1 \mathbf{U}_1 \mathbf{W}_1 \mathbf{U}_1^H, \ldots, \alpha_K \mathbf{U}_K \mathbf{W}_K \mathbf{U}_K^H)$;
7:   $\mathbf{B} = \text{blkdiag}(\alpha_1 \mathbf{W}_1 \mathbf{U}_1^H, \ldots, \alpha_K \mathbf{W}_K \mathbf{U}_K^H)$;
8:   $\mathbf{C} = \sum_{\ell=1}^N \mathbf{d}_\ell \mathbf{h}_\ell^H$;   //$\mathbf{d}_\ell$ and $\mathbf{h}_\ell$ are respectively the $\ell$-th column of $\mathbf{D}^H$ and $\mathbf{H}$.
9:   for $n = 1 : N$ do
10:     $a_n = \mathbf{h}_n^H \mathbf{A} \mathbf{h}_n$;
11:     $\mathbf{C} = \mathbf{C} - \mathbf{d}_n \mathbf{h}_n^H$;
12:     $\mathbf{b}_n = -\mathbf{B} \mathbf{h}_n + \mathbf{C} \mathbf{A} \mathbf{h}_n$;
13:     $P_n^{ub} \triangleq \min(P_n^{res}, P_{PAPC}^{ub})$ where $P_n^{res} = P_{TX} - \sum_{\ell \neq n} \|\mathbf{d}_\ell\|_2^2$;
14:     $\mathbf{d}_n = -\mathbf{b}_n \times \max\left(\min\left(\frac{1}{a_n}, \frac{\sqrt{P_n^{ub}}}{\|\mathbf{b}_n\|_2}\right), \frac{\sqrt{P_{PAPC}^{lb}}}{\|\mathbf{b}_n\|_2}\right)$;
15:     $\mathbf{C} = \mathbf{C} + \mathbf{d}_n \mathbf{h}_n^H$;
16:   end for
17:   $i \leftarrow i + 1$;
18: until $R(\mathbf{D}) - R(\tilde{\mathbf{D}}) \leq \epsilon$ or $i > i_{max}$.

Output: $\mathbf{D} = [\mathbf{d}_1, \ldots, \mathbf{d}_N]^H$.

The algorithm is presented for the most generic setting with multi-antenna UEs and multi-layer per UE.

FIG. 3

ENERGY-EFFICIENT PRECODING WITH CONTROLLABLE POWER DISTRIBUTION

RELATED APPLICATION

This application claims benefit of priority from European Patent App. No. 23182677.7, filed Jun. 30, 2023, the disclosure of which is hereby incorporated in its entirety by reference herein.

TECHNICAL FIELD

Some example embodiments may generally relate to mobile or wireless telecommunication systems, such as Long Term Evolution (LTE) or fifth generation (5G) new radio (NR) access technology, or 5G beyond, or other communications systems.

BACKGROUND

Examples of mobile or wireless telecommunication systems may include the Universal Mobile Telecommunications System (UMTS) Terrestrial Radio Access Network (UTRAN), LTE Evolved UTRAN (E-UTRAN), LTE-Advanced (LTE-A), MulteFire, LTE-A Pro, fifth generation (5G) radio access technology or NR access technology, and/or 5G-Advanced. 5G wireless systems refer to the next generation (NG) of radio systems and network architecture. 5G network technology is mostly based on NR technology, but the 5G (or NG) network can also build on E-UTRAN radio. It is estimated that NR may provide bitrates on the order of 10-20 Gbit/s or higher, and may support at least enhanced mobile broadband (eMBB) and ultra-reliable low-latency communication (URLLC) as well as massive machine-type communication (mMTC). NR is expected to deliver extreme broadband and ultra-robust, low-latency connectivity and massive networking to support the IoT.

SUMMARY

Some example embodiments may be directed to a method. The method may include generating a digital precoder with controllable flatness based on at least one of a plurality of control parameters. The method may also include controlling flatness of a power distribution across a set of antennas, panels, or access points. The method may further include balancing, based on the control of the flatness of the power distribution, spectral efficiency and energy efficiency according to respective predefined values of spectral efficiency and energy efficiency. According to certain example embodiments, the balancing may include adjusting the at least one of the plurality of control parameters.

Other example embodiments may be directed to an apparatus. The apparatus may include at least one processor and at least one memory storing instructions that, when executed by the at least one processor, cause the apparatus at least to generate a digital precoder with controllable flatness based on at least one of a plurality of control parameters. The apparatus may also be caused to control flatness of a power distribution across a set of antennas, panels, or access points. The apparatus may further be caused to balance, based on the control of the flatness of the power distribution, spectral efficiency and energy efficiency according to respective predefined values of spectral efficiency and energy efficiency. According to certain example embodiments, the balance may include adjusting the at least one of the plurality of control parameters.

Other example embodiments may be directed to an apparatus. The apparatus may include means for generating a digital precoder with controllable flatness based on at least one of a plurality of control parameters. The apparatus may also include means for controlling flatness of a power distribution across a set of antennas, panels, or access points. The apparatus may further include means for balancing, based on the control of the flatness of the power distribution, spectral efficiency and energy efficiency according to respective predefined values of spectral efficiency and energy efficiency. According to certain example embodiments, the balancing may include adjusting the at least one of the plurality of control parameters.

In accordance with other example embodiments, a non-transitory computer readable medium may be encoded with instructions that may, when executed in hardware, perform a method. The method may include generating a digital precoder with controllable flatness based on at least one of a plurality of control parameters. The method may also include controlling flatness of a power distribution across a set of antennas, panels, or access points. The method may further include balancing, based on the control of the flatness of the power distribution, spectral efficiency and energy efficiency according to respective predefined values of spectral efficiency and energy efficiency. According to certain example embodiments, the balancing may include adjusting the at least one of the plurality of control parameters.

Other example embodiments may be directed to a computer program product that performs a method. The method may include generating a digital precoder with controllable flatness based on at least one of a plurality of control parameters. The method may also include controlling flatness of a power distribution across a set of antennas, panels, or access points. The method may further include balancing, based on the control of the flatness of the power distribution, spectral efficiency and energy efficiency according to respective predefined values of spectral efficiency and energy efficiency. According to certain example embodiments, the balancing may include adjusting the at least one of the plurality of control parameters.

Other example embodiments may be directed to an apparatus that may include circuitry configured to generate a digital precoder with controllable flatness based on at least one of a plurality of control parameters. The apparatus may also include circuitry configured to control flatness of a power distribution across a set of antennas, panels, or access points. The apparatus may further include circuitry configured to balance, based on the control of the flatness of the power distribution, spectral efficiency and energy efficiency according to respective predefined values of spectral efficiency and energy efficiency. According to certain example embodiments, the balance may include adjusting the at least one of the plurality of control parameters.

BRIEF DESCRIPTION OF THE DRAWINGS

For proper understanding of example embodiments, reference should be made to the accompanying drawings, wherein:

FIG. 3 illustrates an example algorithm, according to certain example embodiments.

DETAILED DESCRIPTION

Figure 1:
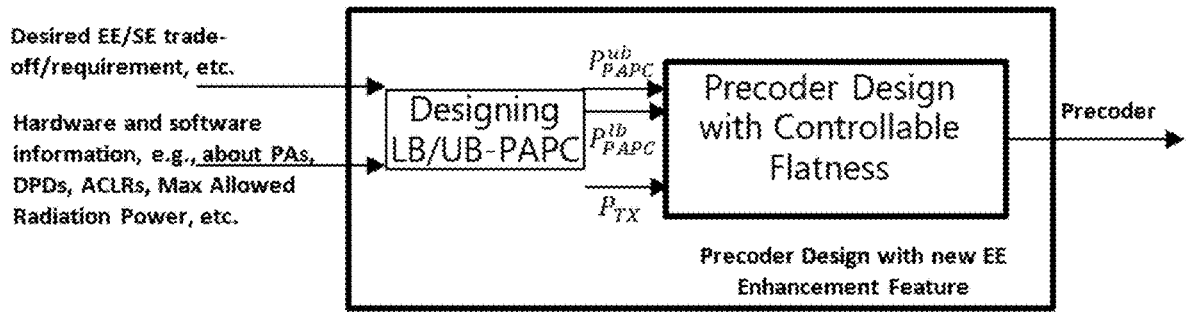
FIG. 1 illustrates an example precoder design, according to certain example embodiments.

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for energy-efficient precoding with controllable power distribution. For instance, certain example embodiments may consider methods and apparatuses of energy-efficient precoding with controllable flatness of power distribution.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments. Further, the terms "base station", "cell", "node", "gNB", "network" or other similar language throughout this specification may be used interchangeably.

As used herein, "at least one of the following: <a list of two or more elements>" and "at least one of <a list of two or more elements>" and similar wording, where the list of two or more elements are joined by "and" or "or," mean at least any one of the elements, or at least any two or more of the elements, or at least all the elements.

Multiple-input multiple output (MIMO) such as massive MIMO, and distributed MIMO (e.g., cell-free MIMO) or centralized MIMO may be utilized to satisfy different stringent key performance indicators (KPIs) of future wireless communication networks. One aspect to consider in the design of (massive) MIMO systems is the power/energy consumption of the beamforming/precoding architectures to ensure that the (massive) MIMO systems can be widely deployed in the cellular network. Different precoding schemes for designing MIMO systems may include maximum ratio transmission (MRT), zero-forcing (ZF), and weighted minimum mean-square error (WMMSE). In some designs, the main target KPI is usually maximizing the spectral efficiency/rate while considering the physical power constraints including sum radiated power constraint (e.g., sum power constraint (SPC)) and/or maximum per antenna (e.g., antenna, panel, access-point (AP)) power constraint (PAPC).

While traditional precoding schemes such as ZF and WMMSE can achieve satisfactory performance in terms of spectral efficiency (SE), they typically lead to wide power variations over different antennas/panels/APs. This together with the fact that the power efficiency of a power amplifier (PA) of an antenna/panel/AP depends on the operation power of that antenna/panel/AP (e.g., the power efficiency increases as it gets closer to saturation level) leads to some power/energy efficiency degradation of the system. Another challenge is a power overshooting issue, which occurs after precoding. In power overshooting, the effective power at some antenna may exceed the limit that is tolerable due to constructive combining of signals from multiple layers/beams/frequencies that may trigger clipping or power scaling back. Thus, there is a need for a module/method/controller that can control the flatness/variation of the powers across different antennas/panels/APs to balance the energy efficiency (EE) and the SE while avoiding power overshooting.

As noted above, some schemes under SPC, such as ZF precoder and WMMSE, seek to maximize the SE while keeping the total radiated power by all, or a portion of, antenna/panels/APs below a predefined threshold. However, in these SPC precoding schemes, the per antenna/panel/AP power varies significantly for (massive) MIMO systems. For example, it may be possible that those schemes design the power of some of the antennas/panels/APs to be larger than their maximum individual limits under which their corresponding PAs are operating in their linear regimes. Thus, a subsequent line of works seeks to ensure that the designed precoders further satisfy a maximum/upper-bound PAPC (UB-PAPC). To ensure that UB-PAPC is satisfied, the precoder design may be scaled down by the SPC precoding schemes. However, this approach leaves much of the power budget unused at other antennas/panels/APs. Although more sophisticated algorithms have also been developed to ensure that the UB-PAPC is satisfied, all the methods/designs may still lead to large variations of powers across different antennas/panels/APs which is not desirable from the energy/power efficiency perspective, which may be an important consideration for future MIMO systems that are expected to be massive in size (i.e., having/consisting of large number of antennas, panels, APs, users, radio frequency (RF) chains, PAs, etc.).

In view of the challenges exhibited by the aforementioned example precoding schemes, certain example embodiments may provide a module/method/controller that can control the flatness/variation of the powers across different antennas/panels/APs that can simultaneously satisfy various power constraints including, for example, SPC, UB-PAPC, and/or a new minimum power constraint per antenna/panel (lower bound per-antenna power constraint (LB-PAPC)). In this way, certain example embodiments may be able to control the flatness of power variations across antennas/panels, and accordingly balance the SE and EE trade-off. Here, the flatness value measures the variations of powers over different antennas/panels. For example, a given precoder may be referred to as a "flat" precoder if that precoder can cause all panels/antennas in an antenna array to use/transmit an equal amount of power, such that the power distribution across antennas is a straight line. In another example, a precoder may cause all panels/antennas of an array to use/transmit power within a predefined range between a minimum power $P_{min}$ and a maximum power $P_{max}$, such that the power distribution across antennas is within $[P_{min}, P_{max}]$. The flatness of such a precoder may be measured as a function of $P_{min}$ and $P_{max}$. For example, the precoder flatness may be defined as a function of the size of the interval (or a difference) between $P_{min}$ and $P_{max}$, e.g., $P_{max} - P_{min}$. Accordingly, the larger the size of the interval (or the larger the difference) between $P_{min}$ and $P_{max}$, the less flat the power distribution of the array and the less flat is the precoder. Additionally, in other example embodiments, it may be possible to achieve a near-flat interval (i.e., close to zero interval) with little to no SE penalty even for the case of when MIMO dimension is not massive. As just one example, in a flat precoder that causes the power distribution of the array to be flat, a minimum power $P_{min}$ may equal a maximum power $P_{max}$, i.e., $P_{max}=P_{min}$, and a difference between a minimum power $P_{min}$ and a maximum power $P_{max}$ may be zero.

According to certain example embodiments, the LB-PAPC and UB-PAPC may be designed/set/configured based on one or more hardware/software characteristics of the base station (BS) unit/APs/etc., such as, but not limited to, PAs, digital predistortions (DPDs), adjacent channel leakage ratios (ACLRs), and maximum allowed radiated power. According to some example embodiments, the LB-PAPC and UB-PAPC may be designed/set/configured based on EE/SE trade-off requirements of the systems. For example, by setting LB-PAPC and UB-PAPC to be equal per panel/antenna, it may be possible to achieve a complete "flat precoding" structure that ensures that there are no power variations over different antenna/panels (i.e., all panels/antennas have the same radiated/consumed power), and all PAs may operate at their maximum possible efficiency. Such a completely flat precoding may lead to the least/smallest power consumption or the best EE, but it may also cause some performance degradation in terms of SE. In another example, some level of deviation from complete flatness may be adopted in order to improve the SE, but such deviation may cause the power consumption to increase, thereby causing EE to decrease. In an example, the transmitter may determine a desired and/or achievable level of flatness based on the SE and/or EE requirements, which, in turn, may depend on the different parameters including, but not limited to, available (power/energy) resources, the traffic demand, and so on.

According to other example embodiments, the LB-PAPC may be designed/set/configured such that the PA efficiency of all antennas/panels/APs is greater than or equal to a predefined threshold denoted by $\eta_{th}^{LB}$. For example, the efficiency of the i-th PA denoted by $\eta_i$ may be a function of the operational PA output power $p_i$, e.g., $\eta_i=f(p_i)$, where the function may depend on the type of the PA (and it is typically a non-decreasing or increasing function of the output power). Then, in order to make sure that the efficiency is greater than or equal to the predefined threshold $\eta_{th}^{LB}$, the LB-PAPC may be designed/set/configured such that $f(p_i) \geq \eta_{th}^{LB}$ or equivalently $p_i \geq f^{-1}(\eta_{th}^{LB})$.

In some example embodiments, the UB-PAPC may be set within a predefined threshold $\Delta_p^{DPD}$ from the maximum allowed power (denoted by $p_{max}$) at all antennas/panels/APs based on the DPD constraints (e.g., larger gap if DPD capability is lower), e.g., $p_i \leq p_{max}-\Delta_p^{DPD}$. In other example embodiments, the UB-PAPC may be set within a predefined threshold $\Delta_p^{ACLR}$ from the maximum allowed power at all antennas/panels/APs based on the ACLR requirements (e.g., larger gap if ACLR requirement is more stringent/demanding, i.e., more difficult to satisfy or leads to larger power variations), e.g., $p_i \leq p_{max}-\Delta_p^{ACLR}$.

In further example embodiments, the LB-PAPC and UB-PAPC may be set to ensure that SE is above a predefined threshold $SE_{target}$, while EE is maximized. For example, an example system may be configured to select initial values of LB-PAPC and UB-PAPC, such as selecting no LB-PAPC (or setting LB-PAPC equal to minus infinity), and selecting UB-PAPC based on the maximum allowed power and/or other practical requirements such as DPD, ACLR, etc., as explained above. If the SE requirement is satisfied (SE is larger than the threshold, i.e., $SE>SE_{target}$), the system may be configured to increase the LB-PAPC by a predefined incremental value to improve the EE. The system may be configured to repeat the procedure until the SE requirement is no longer satisfied. In this manner, the system identifies the largest LB-PAPC that still corresponds to the satisfied SE requirement as being the best solution that satisfies the SE while maximizing the EE.

In another example, an example system may be configured to select the LB-PAPC by setting the LB-PAPC equal to the UB-PAPC and determine whether the SE requirement is satisfied. If the SE requirement is satisfied, then this solution may also maximize the EE. If the SE requirement is not satisfied, the system may be configured to relax, e.g., reduce, the LB-PAPC by a predefined incremental value and, again, determine whether the SE requirement is satisfied. In this manner, the system may be configured to repeat the previous step to relax the LB-PAPC until the SE target is satisfied.

In other example embodiments, the LB-PAPC and UB-PAPC may be set to ensure that EE is above a threshold $EE_{target}$, while SE is maximized. For example, an example system may be configured to select initial values of LB-PAPC and UB-PAPC, such as selecting no LB-PAPC (or setting LB-PAPC equal to minus infinity) and selecting UB-PAPC based on the maximum allowed power and/or other practical requirements such as DPD, ACLR, etc., as explained above, and then determining whether the EE requirement is satisfied. If the EE requirement is not satisfied (EE is less than or equal to the threshold, i.e., $EE \leq EE_{target}$), the LB-PAPC can be set to a larger value for purpose of satisfying the EE. This procedure can be repeated until the EE requirement is satisfied. In that case, the lowest LB-PAPC that satisfies the EE requirement is a best solution that satisfies the EE requirement while maximizing the SE. In another example embodiment, one can start from the LB-PAPC equal to the UB-PAPC and keep relaxing/reducing the LB-PAPC until the EE requirement is not satisfied. Then the smallest LB-PAPC that still satisfies the EE requirement may also maximize the SE.

FIG. 1 illustrates an example precoder design, according to certain example embodiments. For example, a controller/module as illustrated in FIG. 1 may be configured to design a precoder based on available information about software/hardware properties and a desired/required quality of the service (QoS) and available resources. For example, the available software/hardware information include properties of PAs, DPDs, ACLRs, maximum allowed radiated power, etc. For example, the desired/required quality of the service (QOS) may be in terms of SE and/or EE. For example, the available resources may be in terms of the available power/energy that can be consumed for a certain desired QoS. In an example, the controller/module may use the available information about software/hardware properties and the desired/required QoS and available resources to calculate/design/set LB-PAPC and UB-PAPC. In an example, the controller/module may use the calculated LB-PAPC, UB-PAPC and maximum allowed transmitted power to design the precoder with controllable flatness. In an example, the controllability of the flatness may be achieved by designing the LB-PAPC and UB-PAPC.

As described herein, certain example embodiments may provide a design for efficient ZF and WMMSE algorithms that can control flatness of the power distribution by solving an optimization problem that includes all three sets of power constraints including, for example, LB-PAPC, UB-PAPC, and SPC. In particular, as described above, certain example embodiments may provide a module/controller at a radio unit (RU) of the BS with memory and a processor that can set the required flatness of the radiated power across antennas/panels/APs to balance SE and EE needs for different communication service provider (CSP) customers. This module/controller may provide an EE enhancement feature while maintaining the SE. Additionally, according to some example embodiments, the algorithms/methods/results may be applied to the centralized massive/non-massive MIMO systems, as well as the distributed massive/non-massive MIMO (e.g., cell-free massive/non-massive MIMO). Certain example embodiments may also be applicable to MIMO systems with fully digital precoding as well as hybrid beamforming architectures. The single-carrier as well as multi-carrier systems may be applicable to certain example embodiments.

As described herein, although in some example embodiments the system-model, algorithms, methods, results, etc., may be presented for a centralized massive MIMO system with a single BS employing massive number of antennas and fully digital precoding, other example embodiments may utilize the algorithms, methods, results, etc. in distributed massive MIMO (e.g., cell-free massive MIMO) and/or massive MIMO systems with hybrid beamforming architectures where the per-antenna power constraint may be readily applied as per-(sub) panel or per-AP power constraint. Additionally, the system model of certain example embodiments may be applicable for one single-carrier narrow-band channel, whereas in other example embodiments, the method described herein may be applicable to a multi-carrier setting as well.

Certain example embodiments may provide a system model. The system model may consider a downlink (DL) multi-user MIMO system in which a BS with N antennas serves K users, each with $M_k$ antennas. For example, let $s_k \in \mathbb{C}^{L_k}$ (with $L_k \leq M_k$) denote the vector of intended symbols for user k, and $D_k \in \mathbb{C}^{N \times L_k}$ denote the digital linear precoder associated with user k. Then, the transmitted signal can be written as:

$$x = \sum_{k=1}^{K} D_k s_k. \qquad (1)$$

Assuming flat-fading narrow-band channel model (extension to wideband frequency-selective model may be straightforward by applying the same processing over each coherence bandwidth or narrower bandwidth), the received signal at user k may be expressed as:

$$y_k = H_k x + n_k = H_k D_k s_k + \sum_{j \neq k} H_k D_j s_j + n_k, \qquad (2)$$

where $H_k \in \mathbb{C}^{M_k \times N}$ is the channel matrix from the BS to user k, $n_k$ is the additive white Gaussian noise vector with distribution CN (0, $\sigma^2 I$). For such a system, if independent and identically distributed (i.i.d.) standard Gaussian signaling is assumed, the achievable rate for user k is then given by:

$$R_k = \text{logdet}\left(I + H_k D_k D_k^H H_k^H \left(\sum_{j \neq k} H_k D_j D_j^H H_k^H + \sigma^2 I\right)^{-1}\right). \qquad (3)$$

According to certain example embodiments, SE of the multi-user MIMO system may be maximized. Given the weight priorities for the users as $\alpha$'s, the SE can be modeled as the weighted sum rate such as, for example:

$$R(D) = \sum_{k=1}^{K} \alpha_k R_k. \qquad (4)$$

With equation (4), it may be possible to design the digital precoder D=[$D_1, \ldots, D_K$] such that the weighted sum rate R (D) is maximized while also satisfying the required power constraints. In certain example embodiments, three different sets of power constraints may be considered. In particular, in addition to the traditional SPC and UB-PAPC constraint, an LB-PAPC may be included to improve EE of the multi-user MIMO system.

With regard to SPC, in certain example embodiments, the radiated power from the BS may be limited such that the amount of interference it can cause to other cells/networks and the amount of electromagnetic field (EMF) exposure are under control. In certain example embodiments, the SPC may be considered as follows:

$$\sum_{k=1}^{K} \text{trace}\left(D_k D_k^H\right) \leq P_{TX}, \qquad (5)$$

where $P_{TX}$ denotes the maximum allowed radiated power from the BS.

According to certain example embodiments, the UB-PAPC constraint may be set/configured. For example, in practical systems, the PA of each antenna may have its own transmission power limit. However, other considerations such as the capability of DPD and the requirement of ALCR may also impose a limit on the extent that the PA could be operated in the non-linear regime. Thus, in certain example embodiments, the digital precoder may satisfy an upper-bound constraint $P_{PAPC}^{ub}$ such that:

$$\sum_{k=1}^{K} \text{diag}\left(D_k D_k^H\right) \leq P_{PAPC}^{ub} \cdot 1_N, \qquad (6)$$

where $1_N$ denotes all-ones vector of size N. In equation (6), the all-ones vector is a simplification and can be readily extended to more general cases such as, for example, by replacing $1_N$ with a vector $\beta$, where each element of $\beta$ satisfies $0 \leq \beta_n \leq 1$, to reflect the different characteristics/needs of different antennas/sub-panels/APs.

According to other example embodiments, the LB-PAPC constraint may also be set/configured. For example, a lower-bound for each antenna power may be set/configured to control the level of flatness of the precoder (i.e., flatness of the power cumulative distribution function (CDF)). As provided herein, the flatness value measures the variations of powers over different antennas/panels. For example, if a precoder may lead/translate/make all panels/antennas in a (large) antenna array to use/transmit an equal power, then the power distribution of the antennas is a straight line, and it can be said that it is a completely flat precoder. According to some example embodiments, the digital precoder may satisfy a lower-bound constraint $P_{PAPC}^{lb}$ such that:

$$\sum_{k=1}^{K} \text{diag}(D_k D_k^H) \geq P_{PAPC}^{lb} \cdot 1_N, \quad (7)$$

where, similar to the UB-PAPC in equation (6), the all-ones vector is a simplification and can be readily extended to more general cases to reflect the different characteristics/needs of different antennas/sub-panels/APs. Additionally, UB-PAPC and UL-PAPC may be set according to the desirable level of flatness. For example, by setting $P_{PAPC}^{lb} = P_{PAPC}^{ub}$, it may be possible to achieve a completely flat digital precoder and, thus, potentially improve the power efficiency of the multi-user MIMO system. The desirable level of flatness may be defined based on system components/algorithms such as ACLR, characteristics of PAs, digital predistortion, etc., and/or the desirable system KPIs (e.g., balancing the EE and SE).

Considering the aforementioned objective function and the power constraints, the overall problem of interest may be formulated as follows:

$$\max_{\{D_k\}_{\forall k}} \sum_k \alpha_k \log\det\left(I + H_k D_k D_k^H H_k^H \left(\sum_{j \neq k} H_k D_j D_j^H H_k^H + \sigma^2 I\right)^{-1}\right) \quad (8a)$$

$$\text{s.t.} \quad \sum_{k=1}^{K} \text{trace}(D_k D_k^H) \leq P_{TX}, \quad (8b)$$

$$\sum_{k=1}^{K} \text{diag}(D_k D_k^H) \leq P_{PAPC}^{ub} \cdot 1_N, \quad (8c)$$

$$\sum_{k=1}^{K} \text{diag}(D_k D_k^H) \geq P_{PAPC}^{lb} \cdot 1_N, \quad (8d)$$

In certain example embodiments, the ZF structure may further be enforced to where the interference terms in the sum rate expression are completely omitted. Then, by recognizing that the ZF structure is not always optimal and finding the ZF solution for equations (8a)-(8d) may be computationally expensive, certain example embodiments may re-solve the problem in equations (8a)-(8d) directly and provide a WMMSE for solving the problem in equations (8a)-(8d).

Certain example embodiments may provide an algorithm with controllable flatness. For instance, in certain example embodiments, the ZF structure may be enforced between all the layers, e.g., data streams or intended transmitted signals/symbols. For simplicity of notation, in this part the number of layers per user may be assumed as one (i.e., $L_k=1$). However, the algorithm may also be applied to the multi-layer per user case, by simply treating different layers of a user as different users. Further, again for simplicity, it may be assumed that the number of antennas at each user is one (i.e., $M_k=1$) such that the channel matrix of each user $H_k$ is reduced to a channel vector $h_k^H$, and the corresponding digital precoding matrix $D_k$ can now be denoted by a vector $d_k$. Again, the algorithm of certain example embodiments may still be applied to the case of multi-antenna users. For example, in that scenario each user is first fixing its received beamformer (e.g., combiner), for example by using an eigen beamforming corresponding to the user's channel, and then the channel vector used in the algorithm may be the effective channel obtained by the multiplication of the channel and the user's combiner.

Following the above considerations, enforcing the ZF structure may be mathematically modeled as: $h_j^H d_k = 0$, $\forall j \neq k$. Furthermore, due to the ZF structure, all the interference between the layers may be omitted and the problem in equations (8a) to (8d) may be re-written as:

$$\max_D \sum_{k=1}^{K} \alpha_k \log\left(1 + \frac{|h_k^H d_k|^2}{\sigma^2}\right) \quad (9a)$$

$$\text{s.t.} \quad \sum_{k=1}^{K} \text{trace}(d_k d_k^H) \leq P_{TX}, \quad (9b)$$

$$\sum_{k=1}^{K} [d_k d_k^H]_{n,n} \leq P_{PAPC}^{ub}, \quad \forall n = 1, \ldots, N, \quad (9c)$$

$$\sum_{k=1}^{K} [d_k d_k^H]_{n,n} \geq P_{PAPC}^{lb}, \quad \forall n = 1, \ldots, N, \quad (9d)$$

$$h_j^H d_k = 0, \quad \forall j \neq k, \quad (9e)$$

where $[X]_{n,n}$ denotes the n-th diagonal elements of matrix X. Here, the rank-one covariance matrix of the digital precoder of each stream may be defined as $Q_k = d_k d_k^H$. Then the problem in equations (9a)-(9e) can be rewritten as the following problem:

$$\max_D \sum_{k=1}^{K} \alpha_k \log\left(1 + \frac{1}{\sigma^2} h_k^H Q_k h_k\right) \quad (10a)$$

$$\text{s.t.} \quad 1^T \text{diag}\left(\sum_k Q_k\right) \leq P_{TX}, \quad (10b)$$

$$\sum_{k=1}^{K} [Q_k]_{n,n} \leq P_{PAPC}^{ub}, \forall n = 1, \ldots, N, \quad (10c)$$

$$\sum_{k=1}^{K} [Q_k]_{n,n} \geq P_{PAPC}^{lb}, \forall n = 1, \ldots, N, \quad (10d)$$

$$h_j^H Q_k h_j = 0, \forall j \neq k, \quad (10e)$$

$$\text{rank}(Q_k) = 1, \forall k. \quad (10f)$$

The problem in equations (10a)-(10f) would be a convex problem without the rank-one constraints in (10f). However, certain example embodiments may show that if the rank-one constraints are relaxed, and the remaining problem is solved, the optimal solution of the relaxed problem is still rank one. Thus, the design of digital precoders may be recovered based on the optimal rank-one $Q_k$ using eigen value decomposition. Such a property of this problem provides the ability to transform the ZF precoding design problem under the desired power constraints as a convex optimization problem which may be solved using convex optimization tools/packages including, for example, CVX, a modeling system/toolbox/software for constructing and solving disciplined convex programs.

While it may be possible for certain example embodiments to use the convex optimization tools/packages to find the global optimal solution to the problem in equations (10a)-(10f), the computational complexity of those approaches may still be high. To reduce the computational complexity of finding the desirable ZF solution, sub-gradient and/or approximation methods may be used. However, since the ZF precoding in general is not always an optimal precoding, instead of focusing on reducing the computational complexity of finding ZF solution, it may be possible to directly address the original problem in equations (8a)-(8d), and find an efficient solution to that problem.

According to certain example embodiments, a WMMSE algorithm with controllable flatness may be provided. For example, the weighted sum rate maximization problem in equations (8a)-(8d) is a non-convex problem. One way to address such weighted sum rate maximization problems is to convert them into their equivalent mean-square error (MSE) minimization problems. To do so, the following lemma:

Lemma 1: Given $A \in \mathbb{C}^{n \times p}$, $B \in \mathbb{C}^{p \times 1}$ and any positive definite matrix $N \in \mathbb{C}^{n \times n}$, the following equation holds:

$$\text{logdet}(I + ABB^H A^H N^{-1}) = \max_{\Omega > 0, \Gamma} \text{logdet}(\Omega) - \text{trace}(\Omega E(\Gamma, B)) + \ell, \quad (11)$$

where $\Gamma \in \mathbb{C}^{n \times 1}$ and $\Omega \in \mathbb{C}^{l \times l}$ are auxiliary variables, and $$E(\Gamma, B) = (I - \Gamma^H AB)(I - \Gamma^H AB)^H + \Gamma^H N \Gamma. \quad (12)$$

Further, the optimal solutions of $\Gamma$ and $\Omega$ for the right-hand side of (11) are respectively given by:

$$\Gamma^* = (N + ABB^H A^H)^{-1} AB, \text{ and} \quad (13)$$

$$\Omega^* = (E(\Gamma^*, B))^{-1} = (I - \Gamma^{*H} AB)^{-1}. \quad (14)$$

With equations (11)-(14), Lemma 1 may be used to convert the weighted sum rate maximization to MSE minimization. In certain example embodiments, it may be possible to take steps for a weighted sum rate maximization problem with the UB-PAPC or the SPC while also satisfying three sets of constraints including, for example, LB-PAPC, UB-PAPC, and SPC.

According to certain example embodiments, to convert the weighted sum rate maximization to MSE minimization, the following may be defined: $A_k = H_k$, $B_k = D_k$ and $N_k = \Sigma_{j \neq k} H_k D_j D_j^H H_k^H + \sigma^2 I$. Further, for the ease of notation, $\mathcal{P}$ denotes a set of digital precoders that are satisfying all three sets of power constraints in the problem in equations (8a)-(8d). This means that it is desired to look for a digital precoder that belongs to the set $\mathcal{P}$ (i.e., $D \in \mathcal{P}$). By these considerations, based on Lemma 1, it may be possible to rewrite the weighted rate maximization problem in equations (8a)-(8d) as the following weighted MSE minimization problem:

$$\min_{W, U, D} \sum_{k=1}^{K} \alpha_k (\text{trace}(W_k E_k) - \text{logdet}(W_k)) \quad (15a)$$

$$\text{s.t. } D \in \mathcal{P}, \quad (15b)$$

where W and U (which are collections of $W_k$'s and $U_k$'s) are two auxiliary variables (respectively playing the same roles as $\Omega$ and $\Gamma$ in Lemma 1) and $$E_k = (I - U_k^H H_k D_k)(I - U_k^H H_k D_k)^H + U_k^H \left(\sum_{j \neq k} H_k D_j D_j^H H_k^H + \sigma^2 I\right) U_k, \quad (16)$$

From equations (15) and (16), $U_k$ may be interpreted as a combiner used at user k to recover its intended symbols, $E_k$ as a corresponding MSE. Furthermore, $W_k$ may be interpreted as the appropriate MSE weights to ensure that the weighted sum rate maximization problem and the weighted MSE minimization problem are equivalent.

According to certain example embodiments, an algorithm may be provided to address the MSE minimization problem in equation (15). Since a digital precoder obtained by solving the problem in equation (15) satisfies both LB and UB PAPC (and these two bounds can be made arbitrarily small), a method may be known as a Flat-WMMSE algorithm. By appropriately selecting the LB-PAPC and UB-PAPC, it may be possible to control the level of flatness of the designed precoder.

Figure 2:
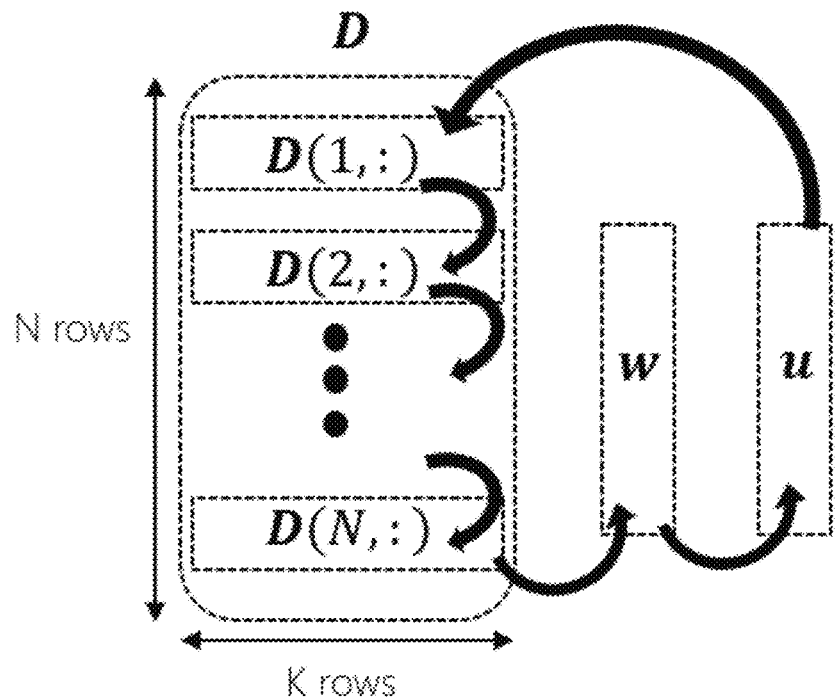
FIG. 2 illustrates an example a schematic of a proposed block coordinate descent algorithm, according to certain example embodiments.

The MSE minimization problem in equation (15) is a non-convex optimization problem in terms of all the optimization variables. However, the problem may be decomposed in terms of a set of variables (called block variables) such that given all block variables except only one variable, the remaining problem is convex in terms of that variable. For the considered problem of interest, the natural choice for such variables is U, W, and rows of D. Such a block coordinate descent algorithm may be visualized in FIG. 2 assuming $L_k = L$. Specifically, FIG. 2 illustrates a schematic of the proposed block coordinate descent algorithm for solving the problem in (15), according to certain example embodiments.

Based on Lemma 1 (i.e., equation (13)), it may be possible to find a closed-form expression for U given D and W as:

$$U_k = \left(\sum_{j=1}^{K} H_k D_j D_j^H H_k^H + \sigma^2 I\right)^{-1} H_k D_k, \forall k. \quad (17)$$

Furthermore, based on equation (14), the optimal W for given U and D can be obtained by:

$$W_k = (I - U_k^H H_k D_k)^{-1}, \forall k \quad (18)$$

In certain example embodiments, the optimal design may be provided for a row of D (or equivalently a column of $D^H$) when all other rows, U, and W are fixed. To simplify the notation in this part, $d_n$ may denote the n-th column of $D^H$. Then, it may be possible to show that the problem of designing $d_n$ given all other block variables can be written as:

$$\max_{d_n} a_n \|d_n\|_2^2 + 2 Re(b_n^H d_n) \quad (19a)$$

$$\text{s.t. } \|d_n\|_2^2 \leq P_n^{res}, \forall n = 1, \ldots, N, \quad (19b)$$

$$\|d_n\|_2^2 \leq P_{PAPC}^{ub}, \forall n = 1, \ldots, N, \quad (19c)$$

$$\|d_n\|_2^2 \geq P_{PAPC}^{lb}, \forall n = 1, \ldots, N, \quad (19d)$$

where $$a_n = h_n^H A h_n, \quad (20a)$$

-continued $$b_n = -Bh_n + \sum_{\ell \neq n} d_\ell h_\ell^H A h_n, \quad (20b)$$

$$A = blk\text{diag}(\alpha_1 U_1 W_1 U_1^H, \ldots, \alpha_K U_K W_K U_K^H), \quad (20c)$$

$$B = blk\text{diag}(\alpha_1 W_1 U_1^H, \ldots, \alpha_K W_K U_K^H), \quad (20d)$$

$$P_n^{res} = P_{TX} - \sum_{\ell \neq n} \|d_\ell\|_2^2, \quad (20e)$$

and $h_n$ being the n-th column of the overall channel matrix $H = [H_1^T, \ldots, H_K^T]^T$. By looking at the quadratic objective function of equations (19a)-(19d), it can be seen that the optimal design of $d_n$ should be in the direction of $-b_n$. Ignoring the constraints, it may be shown that the maximizer of (19a) is given by $$\frac{-1}{a_n} b_n.$$

However, for the actual problem with constraints, the scaling factor for $-b_n$ may be designed such that it ensures all the constraints are satisfied, for example:

$$d_n = -b_n \times \max\left(\min\left(\frac{1}{a_n}, \frac{\sqrt{P_n^{ub}}}{\|b_n\|_2}\right), \frac{\sqrt{P_{PAPC}^{lb}}}{\|b_n\|_2}\right), \quad (21)$$

where $P_n^{ub} = \min(P_n^{res}, P_{PAPC}^{ub})$. The computation of $b_n$ has a complexity of $\mathcal{O}(N)$.

Figure 4:
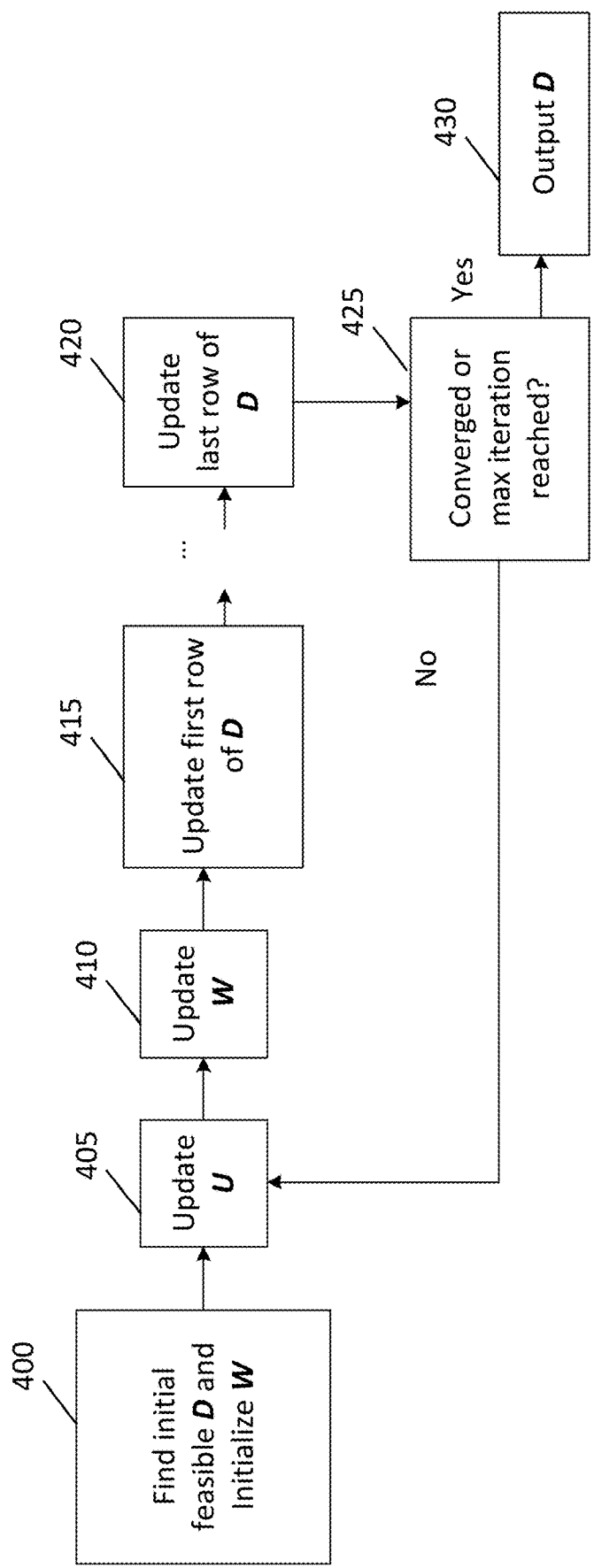
FIG. 4 illustrates an example system flowchart for flat-weighted minimum mean-square error (WMMSE), according to certain example embodiments.

In certain example embodiments, it may be concluded that computing all $b_n$ in each iteration imposes a complexity of $\mathcal{O}(N^2)$. However, by considering the structure of $\sum_{\ell \neq n} d_\ell h_\ell^H$ which can be written as $\sum_{\ell=1}^{N} d_\ell h_\ell^H - d_n h_n^H$, it may be possible to recursively update $C = \sum_{\ell \neq n} d_\ell h_\ell^H$ as computing each $b_n$. Following this strategy, a linear-complexity algorithm may be obtained for the weighted sum rate maximization problem with all desirable power constraints (see Algorithm 1 in FIG. 3). In Algorithm 1 shown in FIG. 3, in lines 13 and 14, both UB-PAPC and LB-PAPC are considered and treated by enforcing the power of each row of the precoder $d_n$ to be larger than the $P_{PAPC}^{lb}$ and to be smaller than $P_n^{ub} = \min(P_n^{res}, P_{PAPC}^{ub})$. In such an efficient algorithm which may be called "flat-WMMSE" algorithm, U, W, and $d_n$ may iteratively be updated, and n=1, . . . , N, as shown in the system flowchart of FIG. 4, until convergence or reaching to the predefined maximum number of iterations. In particular, FIG. 4 illustrates an example system flowchart for flat-WMMSE, according to certain example embodiments. In FIG. 4, the module/block 400 finds/calculates an initial precoder D and the weight matrix W. For example, the initial precoder may be feasible. In another example, the initial precoder may be not feasible. The module/block 405 in FIG. 4 calculates/updates the combining matrices U. The calculation/update of U may be according to the equation (17). The module/block 410 in FIG. 4 calculates/updates the weight matrices W. The calculation/update of W may be according to the equation (18). Then, each row of the precoder D is updated/calculated. Each row of the precoder D may be updated/calculated sequentially (or in parallel). For example, the module/block 415 in FIG. 4 calculates/updates the first row of the precoder D. For example, the module/block 420 in FIG. 4 calculates/updates the last row of the precoder D. The calculation/update of each row of D may be according to the equation (21). For example, the module/block 425 in FIG. 4 checks whether the algorithm is converged or not. For example, the module/block 425 in FIG. 4 checks whether the algorithm reaches to the max allowed iterations or not. For example, if the algorithm is converged or reaches the maximum allowed iterations, the precoder is set as output by the module/block 430. For example, if the algorithm is not converged or does not reach to the maximum allowed iterations, the algorithm returns to the step of updating/calculating U using the module/block 400. Certain example embodiments may emphasize that such a block coordinate descent algorithm (with no maximum of number of iteration constraint) is guaranteed to converge to a stationary solution of the original weighted sum rate maximization problem.

Certain example embodiments may provide various implementations of the WWMSE and ZF algorithms. For instance, the power constraints may be set. The maximum radiated power $P_{TX}$ is typically given. Further, based on the saturation power of the employed power amplifiers ($P_{sat}$ in dBW), desirable backoff from that saturation power ($P_{backoff}$ in dB, which depends on DPD capability, ALCR requirement, etc.), and the insertion losses of the components after the power amplifier ($P_{IL}$ in dB), certain example embodiments may set an actual limitation on the maximum power of each antenna as:

$$P_{PAPC}^{ub(actual)} = db2pow(P_{sat} - P_{backoff} - P_{IL}), \quad (22)$$

where the operator db2pow(.) translates the dB scale to the linear scale. Based on such an upper-bound on per antenna power, it may be noticed that the maximum radiated power cannot go beyond $N_{PAPC}^{ub(actual)}$. On the other hand, the maximum allowed radiated power is given as $P_{TX}$. Thus, the maximum radiated power may be given by min ($N_{PAPC}^{ub(actual)}$, $P_{TX}$) to satisfy both constraints (e.g., (1) the maximum radiated power cannot go beyond $NP_{PAPC}^{ub(actual)}$; and (2) the maximum allowed radiated power is given as $P_{TX}$). Depending on which of these two terms is larger, the upper-bound and lower-bound may be set in the algorithms.

For example, in certain example embodiments, if $NP_{PAPC}^{ub(actual)} \geq P_{TX}$, one possible design may be allowing the antenna powers to vary around the average radiated power per antenna $$\left(\text{i.e., } \frac{P_{TX}}{N}\right)$$

in all interval of size $2\Delta_p$ dB as follows:

$$P_{PAPC}^{ub} = db2pow\left(pow2db\left(\frac{P_{TX}}{N}\right) + \Delta_p\right), \quad (23a)$$

$$P_{PAPC}^{lb} = db2pow\left(pow2db\left(\frac{P_{TX}}{N}\right) - \Delta_p\right), \quad (23b)$$

where the operator pow2db(.) translates the linear scale to the dB scale. The choice of $\Delta_p$ may impact the SE/EE trade-off. Further $\Delta_p$ can be set based on the hardware/software of the system such as PA characteristics, ACLR, DPD, etc. In certain example embodiments, such a choice of defining the antenna power range is an example and it can be changed to any other forms.

Furthermore, when $NP_{PAPC}^{ub(actual)} < P_{TX}$, all antennas may be forced to operate at their maximum powers $P_{PAPC}^{ub(actual)}$ since, even in the case of working at the maximum power, for example:

$$P_{PAPC}^{ub} = P_{PAPC}^{lb} = P_{PAPC}^{ub(actual)}, \quad (24)$$

the total radiated power is below the maximum allowed radiated power $P_{TX}$.

In certain example embodiments, the flat-WMMSE algorithm may require a choice of the initial digital precoder. Any random (feasible) digital precoder may be used to start, and for a sufficiently large number of iterations, the algorithm may converge to a satisfactory solution. However, if such a random digital precoder is used as the initialization, it may take many iterations to converge.

To reduce the number of iterations, certain example embodiments may use ZF beamforming (through channel inversion) as the initial digital precoder. For instance, when the number of layers per user is equal to the number of antennas at each user (i.e., $M_k = L_k$), the channel inversion ZF precoding of the form $S^{1/2} H^H (HH^H)^{-1} P^{1/2}$ may be used where P is a diagonal matrix of power allocations for different layers obtained from the water-filling algorithm and S is a diagonal matrix for proper scaling/normalization of per antenna powers. In certain example embodiments, if S is not proportional to the identity matrix, the above design may not exactly be a ZF solution, but sometimes for making the initial precoder feasible it may be desirable to do so. For scenarios where $M_k > L_k$, it may be assumed that eigen beamformer of size $L_k$ is used at the user side. As a result, the ZF procedure may be performed on the effective channel of $H_e = [(V_1 H_1)^T, \ldots, (V_K H_K)^T]^T$, where $V_k$ is the left eigen-vectors corresponding to maximum eigen-values of $H_k$. Therefore, the initial digital precoder, in this example, may be set to $S^{1/2} H_e^H (H_e H_e^H)^{-1} P^{1/2}$.

In certain example embodiments, for some scenarios, such as the case that there is complete flat precoding $P_{PAPC}^{lb} = P_{PAPC}^{ub}$, there is no need to ensure that the initial digital precoder is feasible (i.e., satisfying all three sets of power constraint). Therefore, S may be set to an identity matrix. However, in some regimes, it may be necessary to enforce the feasibility of the initial precoder (e.g., by apply appropriate scaling and normalization on the ZF precoder).

Figure 5:
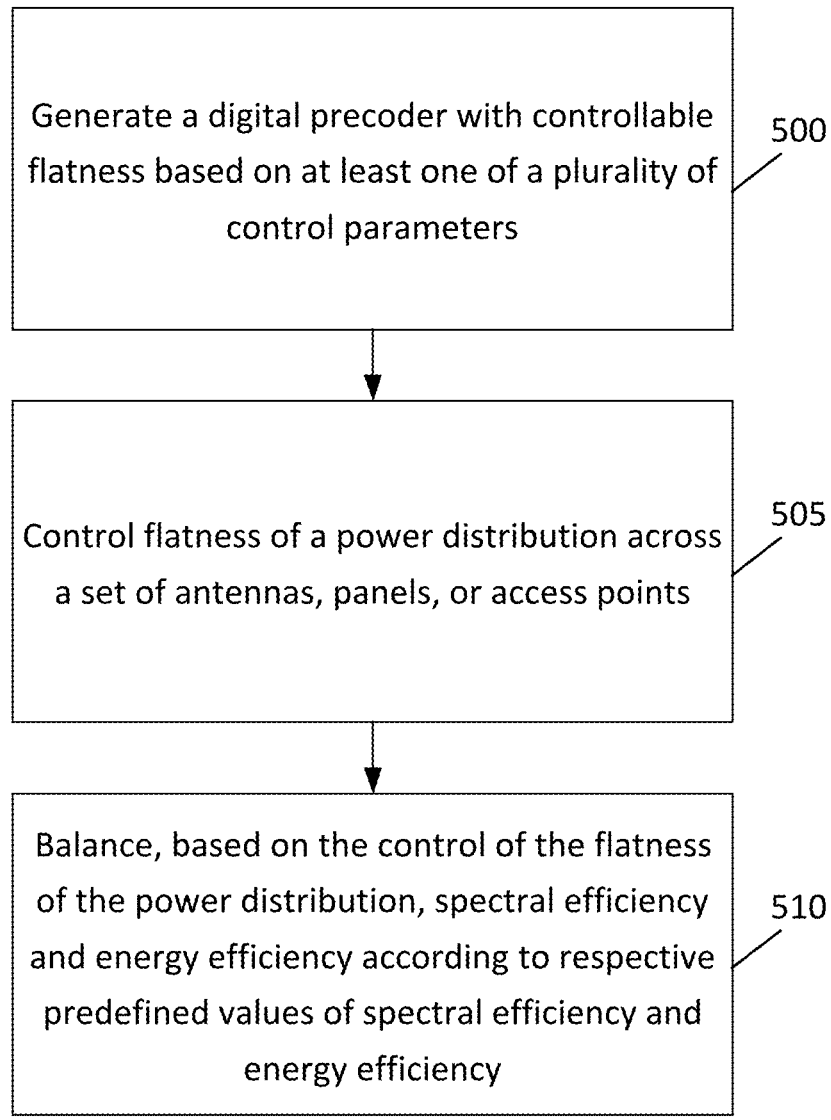
FIG. 5 illustrates an example flow diagram of a method, according to certain example embodiments.

FIG. 5 illustrates an example flow diagram of a method, according to certain example embodiments. In an example embodiment, the method of FIG. 5 may be performed by a network entity, or a group of multiple network elements in a 3GPP system, such as LTE or 5G-NR. For instance, in an example embodiment, the method of FIG. 5 may be performed by a module or controller of an RU similar to one of apparatuses 10 or 20 illustrated in FIG. 6.

According to certain example embodiments, the method of FIG. 5 may include, at 500, generating a digital precoder with controllable flatness based on at least one of a plurality of control parameters. The method may also include, at 505, controlling flatness of a power distribution across a set of antennas, panels, or access points. The method may further include, at 510, balancing, based on the control of the flatness of the power distribution, spectral efficiency and energy efficiency according to respective predefined values of spectral efficiency and energy efficiency. According to certain example embodiments, the balancing may include adjusting the at least one of the plurality of control parameters.

According to certain example embodiments, the at least one of the plurality of control parameters may include at least one of a number of sub-arrays, antennas, or access points to be active for transmission out of a total of N sub-arrays, antennas, or access points, a lower-bound per-antenna power constraint or an upper-bound per-antenna power constraint, a backoff parameter, or a zero-forcing precoding, a weighted minimum mean-square error precoding, or a maximum ratio transmission. According to some example embodiments, the method may also include setting the lower-bound per-antenna power constraint and the upper-bound per-antenna power constraint equal to each other. According to other example embodiments, the method may further include setting the upper-bound per-antenna power constraint within a predefined threshold from a maximum allowed power at the antenna, the panel, or the access point given a digital predistortion constraint.

In certain example embodiments, the method may also include setting the upper-bound per-antenna power constraint within a predefined threshold from a maximum allowed power at the antenna, the panel, or the access point given an adjacent channel leakage ratio requirement. In some example embodiments, the method may further include configuring the upper-bound per-antenna power constraint to satisfy a maximum allowed transmission power for a power amplifier based on at least one of a plurality of hardware and software parameters. In other example embodiments, the method may also include configuring the upper-bound per-antenna power constraint to satisfy a maximum allowed transmission power for a power amplifier based on one of a plurality of adjacent channel leakage ratios. In further example embodiments, the method may include configuring the lower-bound per-antenna power constraint to satisfy a minimum allowed transmission power for a power amplifier based on at least one of a plurality of hardware and software parameters.

According to certain example embodiments, the lower-bound per-antenna power constraint may be configured based on a function of an operational power amplifier output power, and the function may depend on a type of the power amplifier. According to some example embodiments, the method may also include controlling flatness of the power distribution based on a configuration of the lower-bound per-antenna power constraint, and satisfaction of a requirement of a zero-forcing precoding. According to other example embodiments, satisfaction of the requirement of the zero-forcing precoding may include nulling out interference between a plurality of signals from a plurality of beams. According to further example embodiments, the zero-forcing precoding may include antenna-space zero-forcing and beam-space zero-forcing.

In certain example embodiments, generating the digital precoder with controllable flatness may include solving a weighted sum rate maximization problem while satisfying the at least one of the plurality of control parameters. In some example embodiments, controlling flatness of the power distribution may include converting a weighted sum rate maximization of the digital precoder into equivalent weighted mean-square error minimization components while satisfying the at least one of the plurality of control parameters. In other example embodiments, the method may further include generating a linear-complexity algorithm for the weighted sum rate maximization including the lower-bound per-antenna power constraint and the upper-bound per-antenna power constraint. In further example embodiments, the method may also include adjusting power of each row of the digital precoder to be larger than the lower-bound per-antenna power constraint and smaller than the upper-bound per-antenna power constraint.

According to certain example embodiments, the method may further include decomposing the weighted sum rate maximization into a plurality of variables comprising a combiner, a weighted matrix, and rows of the digital precoder. According to other example embodiments, the method may also include updating a first row and a last row of the digital precoder. For instance, in some example embodiments, the updating each row of the digital precoder may be performed in a sequential manner.

Figure 6:
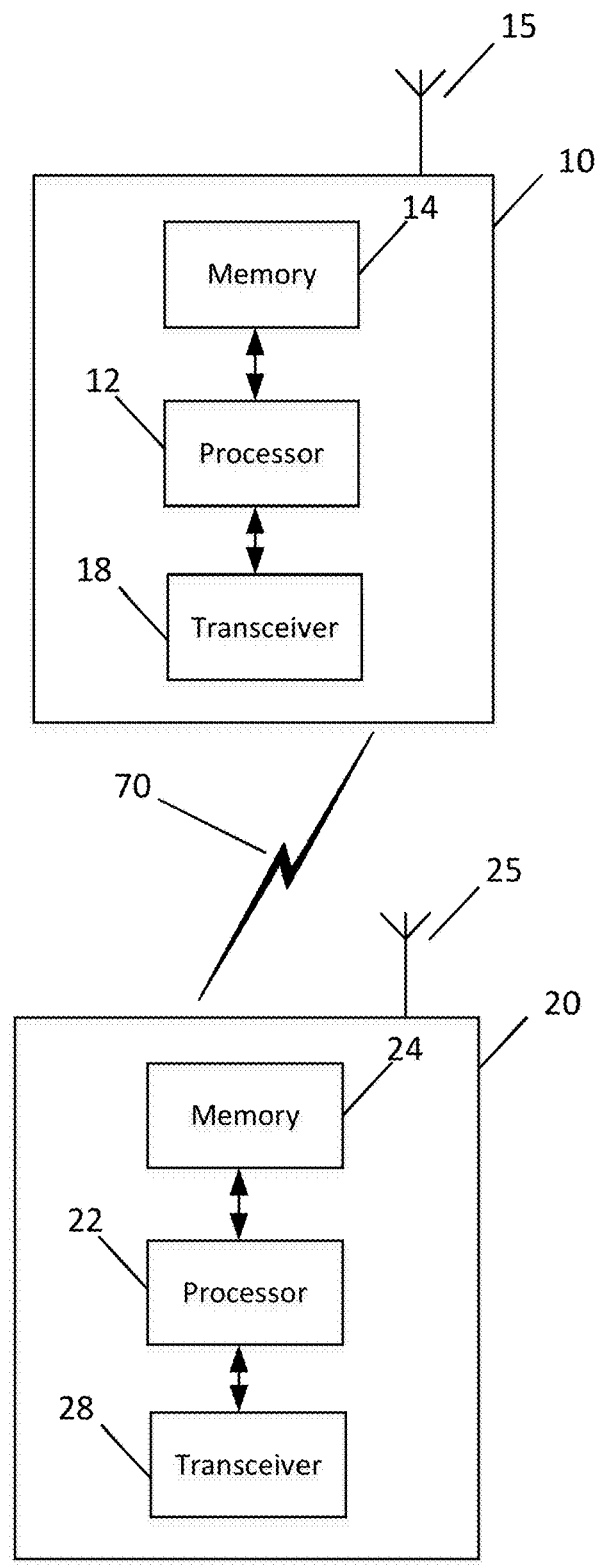
FIG. 6 illustrates a set of apparatuses, according to certain example embodiments.

FIG. 6 illustrates a set of apparatuses 10 and 20 according to certain example embodiments. In certain example embodiments, apparatuses 10 and 20 may be elements in a communications network or associated with such a network. For example, apparatus 10 may be a controller or module at a device, and apparatus 20 may be a network node (i.e., gNB or BS or AP).

In some example embodiments, apparatuses 10 and 20 may include one or more processors, one or more computer-readable storage medium (for example, memory, storage, or the like), one or more radio access components (for example, a modem, a transceiver, or the like), and/or a user interface. In some example embodiments, apparatuses 10 and 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatuses 10 and 20 may include components or features not shown in FIG. 6.

As illustrated in the example of FIG. 6, apparatuses 10 and 20 may include or be coupled to a processors 12 and 22 for processing information and executing instructions or operations. Processors 12 and 22 may be any type of general or specific purpose processor. In fact, processors 12 and 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processors 12 and 22 is shown in FIG. 6, multiple processors may be utilized according to other example embodiments. For example, it should be understood that, in certain example embodiments, apparatuses 10 and 20 may include two or more processors that may form a multiprocessor system (e.g., in this case processors 12 may represent a multiprocessor) that may support multiprocessing. According to certain example embodiments, the multiprocessor system may be tightly coupled or loosely coupled (e.g., to form a computer cluster).

Processors 12 and 22 may perform functions associated with the operation of apparatuses 10 and 20 including, as some examples, precoding of antenna gain/phase parameters, encoding and decoding of individual bits forming a communication message, formatting of information, and overall control of the apparatuses 10 and 20, including processes and examples illustrated in FIGS. 1-5.

Apparatuses 10 and 20 may further include or be coupled to a memories 14 and 24 (internal or external), which may be respectively coupled to processors 12 and 24 for storing information and instructions that may be executed by processors 12 and 24. Memories 14 and 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memories 14 and 24 can be comprised of any combination of random access memory (RAM), read only memory (ROM), static storage such as a magnetic or optical disk, hard disk drive (HDD), or any other type of non-transitory machine or computer readable media. The instructions stored in memories 14 and 24 may include program instructions or computer program code that, when executed by processors 12 and 22, enable the apparatuses 10 and 20 to perform tasks as described herein.

In certain example embodiments, apparatuses 10 and 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processors 12 and 22 and/or apparatuses 10 and 20 to perform any of the methods and examples illustrated in FIGS. 1-5.

In some example embodiments, apparatuses 10 and 20 may also include or be coupled to one or more antennas 15 and 25 for receiving a downlink signal and for transmitting via an UL from apparatuses 10 and 20. Apparatuses 10 and 20 may further include a transceivers 18 and 28 configured to transmit and receive information. The transceivers 18 and 28 may also include a radio interface (e.g., a modem) coupled to the antennas 15 and 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an UL.

For instance, transceivers 18 and 28 may be configured to modulate information on to a carrier waveform for transmission by the antennas 15 and 25 and demodulate information received via the antenna 15 and 25 for further processing by other elements of apparatuses 10 and 20. In other example embodiments, transceivers 18 and 28 may be capable of transmitting and receiving signals or data directly. Additionally or alternatively, in some example embodiments, apparatus 10 may include an input and/or output device (I/O device). In certain example embodiments, apparatuses 10 and 20 may further include a user interface, such as a graphical user interface or touchscreen.

In certain example embodiments, memories 14 and 34 store software modules that provide functionality when executed by processors 12 and 22. The modules may include, for example, an operating system that provides operating system functionality for apparatuses 10 and 20. The memory may also store one or more functional modules, such as an application or program, to provide additional functionality for apparatuses 10 and 20. The components of apparatuses 10 and 20 may be implemented in hardware, or as any suitable combination of hardware and software. According to certain example embodiments, apparatuses 10 and 20 may optionally be configured to communicate each other (in any combination) via a wireless or wired communication links 70 according to any radio access technology, such as NR.

According to certain example embodiments, processors 12 and 22 and memories 14 and 24 may be included in or may form a part of processing circuitry or control circuitry. In addition, in some example embodiments, transceivers 18 and 28 may be included in or may form a part of transceiving circuitry.

For instance, in certain example embodiments, apparatus 10 may be controlled by memory 14 and processor 12 to generate a digital precoder with controllable flatness based on at least one of a plurality of control parameters. Apparatus 10 may also be controlled by memory 14 and processor 12 to control flatness of a power distribution across a set of antennas, panels, or access points. Apparatus 10 may further be controlled by memory 14 and processor 12 to balance, based on the control of the flatness of the power distribution, spectral efficiency and energy efficiency according to respective predefined values of spectral efficiency and energy efficiency. According to certain example embodiments, the balance may include adjusting the at least one of the plurality of control parameters.

In some example embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of the operations.

Certain example embodiments may be directed to an apparatus that includes means for performing any of the methods described herein including, for example, means for generating a digital precoder with controllable flatness based on at least one of a plurality of control parameters. The apparatus may also include means for controlling flatness of a power distribution across a set of antennas, panels, or access points. The apparatus may further include means for balancing, based on the control of the flatness of the power distribution, spectral efficiency and energy efficiency according to respective predefined values of spectral efficiency and energy efficiency. According to certain example embodiments, the balancing may include adjusting the at least one of the plurality of control parameters.

Certain example embodiments described herein provide several technical improvements, enhancements, and/or advantages. For instance, in some example embodiments, it may be possible to control the flatness/variation of the powers across different antennas/panels/APs that can simultaneously satisfy various power constraints. It may also be possible to balance EE and SE while avoiding any power overshooting issues.

A computer program product may include one or more computer-executable components which, when the program is run, are configured to carry out some example embodiments. The one or more computer-executable components may be at least one software code or portions of it. Modifications and configurations required for implementing functionality of certain example embodiments may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to certain example embodiments, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the disclosure as discussed above may be practiced with procedures in a different order, and/or with hardware elements in configurations which are different than those which are disclosed. Therefore, although the disclosure has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

The invention claimed is:

1. A method comprising:
generating a digital precoder with controllable flatness based on at least one of a plurality of control parameters of a number of sub-arrays, antennas, or access points to be active for transmission out of a total of N sub-arrays, N antennas, or N access points, where N is a positive integer not less than 1, wherein the control parameters include a lower-bound per-antenna power constraint and an upper-bound per-antenna power constraint, wherein the lower-bound per-antenna power constraint is based on a function of an output power of a power amplifier of the number of sub-arrays, antennas, or access points that depends on a type of the power amplifier, and wherein the upper-bound per-antenna power constraint is within a predefined threshold from a maximum allowed power at a respective one of the number of sub-arrays, antennas, or access points given an adjacent channel leakage ratio requirement;
controlling flatness of a power distribution across the number of sub-arrays, antennas, or access points based on the lower-bound per-antenna power constraint and the upper-bound per-antenna power constraint, and satisfaction of a requirement of a zero-forcing precoding, wherein the satisfaction of the requirement of the zero-forcing precoding comprises nulling out interference between a plurality of signals from a plurality of beams; and
balancing, based on the controlling of the flatness of the power distribution, spectral efficiency and energy efficiency according to respective predefined values of spectral efficiency and energy efficiency, wherein the balancing comprises adjusting the at least one of the plurality of control parameters.

2. The method according to claim 1, wherein the at least one of the plurality of control parameters, comprises at least one of the following:
a backoff parameter, or
the zero-forcing precoding, a weighted minimum mean-square error precoding, or a maximum ratio transmission.

3. The method according to claim 1, wherein the zero-forcing precoding comprises antenna-space zero-forcing and beam-space zero-forcing.

4. The method according to claim 1,
wherein the generating the digital precoder with controllable flatness comprises solving a weighted sum rate maximization problem while satisfying the at least one of the plurality of control parameters, and
wherein the controlling flatness of the power distribution comprises converting a weighted sum rate maximization of the digital precoder into equivalent weighted mean-square error minimization components while satisfying the at least one of the plurality of control parameters.

5. The method according to claim 4, further comprising:
generating a linear-complexity algorithm for the weighted sum rate maximization comprising the lower-bound per-antenna power constraint and the upper-bound per-antenna power constraint; and
adjusting power of each row of the digital precoder to be larger than the lower-bound per-antenna power constraint and smaller than the upper-bound per-antenna power constraint.

6. The method according to claim 5, further comprising:
decomposing the weighted sum rate maximization into a plurality of variables comprising a combiner, a weighted matrix, and rows of the digital precoder.

7. The method according to claim 6, further comprising: updating each row of the digital precoder.

8. The method according to claim 7, wherein each row of the digital precoder is updated in a sequential manner.

9. An apparatus comprising:
at least one processor; and
at least one memory configured to store instructions that, when executed by the at least one processor, cause the apparatus at least to:
generate a digital precoder with controllable flatness based on at least one of a plurality of control parameters a number of sub-arrays, antennas, or access points to be active for transmission out of a total of N sub-arrays, N antennas, or N access points, where N is a positive integer not less than 1, wherein the control parameters include a lower-bound per-antenna power constraint or an upper-bound per-antenna power constraint, wherein the lower-bound per-antenna power constraint is based on a function of an output power of a power amplifier of the number of sub-arrays, antennas, or access points that depends on a type of the power amplifier, and wherein the upper-bound per-antenna power constraint is within a predefined threshold from a maximum allowed power at a respective one of the number of sub-arrays, antennas, or access points given an adjacent channel leakage ratio requirement;
control flatness of a power distribution across the number of sub-arrays, antennas, or access points based on the lower-bound per-antenna power constraint and the upper-bound per-antenna power constraint, and satisfaction of a requirement of a zero-forcing precoding, wherein the satisfaction of the requirement of the zero-forcing precoding comprises nulling out interference between a plurality of signals from a plurality of beams; and
balance, based on the control of the flatness of the power distribution, spectral efficiency and energy efficiency according to respective predefined values of spectral efficiency and energy efficiency, wherein the balance comprises adjusting the at least one of the plurality of control parameters.

10. The apparatus according to claim 9, wherein the at least one of the plurality of control parameters, comprises at least one of the following:
a backoff parameter, or
the zero-forcing precoding, a weighted minimum mean-square error precoding, or a maximum ratio transmission.

11. The apparatus according to claim 9, wherein the zero-forcing precoding comprises antenna-space zero-forcing and beam-space zero-forcing.

12. The apparatus according to claim 9,
wherein the generation of the digital precoder with controllable flatness comprises solving a weighted sum rate maximization problem while satisfying the at least one of the plurality of control parameters, and
wherein the control flatness of the power distribution comprises converting a weighted sum rate maximization of the digital precoder into equivalent weighted mean-square error minimization components while satisfying the at least one of the plurality of control parameters.

13. The apparatus according to claim 12, wherein the at least one memory stores instructions that, when executed by the at least one processor, further causes the apparatus at least to:
generate a linear-complexity algorithm for the weighted sum rate maximization comprising the lower-bound per-antenna power constraint and the upper-bound per-antenna power constraint; and
adjust power of each row of the digital precoder to be larger than the lower-bound per-antenna power constraint and smaller than the upper-bound per-antenna power constraint.

14. The apparatus according to claim 13, wherein the at least one memory stores instructions that, when executed by the at least one processor, further causes the apparatus at least to:
decompose the weighted sum rate maximization into a plurality of variables comprising a combiner, a weighted matrix, and rows of the digital precoder.

15. The apparatus according to claim 14, wherein the at least one memory stores instructions that, when executed by the at least one processor, further causes the apparatus at least to:
update each row of the digital precoder.

16. The apparatus according to claim 15, wherein each row of the digital precoder is updated in a sequential manner.

* * * * *